(12) United States Patent
Chen et al.

(10) Patent No.: US 11,772,858 B2
(45) Date of Patent: Oct. 3, 2023

(54) AIRTIGHT DEVICE

(71) Applicant: DELTA ELECTRONICS, INC., Taoyuan (TW)

(72) Inventors: Chia-Hsing Chen, Taoyuan (TW);
Chiu-Chin Chang, Taoyuan (TW);
Yan-Hui Jian, Taoyuan (TW);
Chih-Jui Chen, Taoyuan (TW);
Chen-Hsiu Lee, Taoyuan (TW);
Hsuan-Ting Liu, Taoyuan (TW);
Chin-Lung Liu, Taoyuan (TW);
Kuan-Lung Wu, Taoyuan (TW);
Li-Hsiu Chen, Taoyuan (TW);
Wen-Yin Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/657,629

(22) Filed: Apr. 1, 2022

(65) Prior Publication Data

US 2023/0040488 A1     Feb. 9, 2023

Related U.S. Application Data

(60) Provisional application No. 63/203,870, filed on Aug. 3, 2021.

(30) Foreign Application Priority Data

Dec. 21, 2021   (CN) .......................... 202111567734.4

(51) Int. Cl.
*B65D 45/02*     (2006.01)
*B65D 43/16*     (2006.01)
(Continued)

(52) U.S. Cl.
CPC ............. *B65D 45/02* (2013.01); *B65D 43/16* (2013.01); *B65D 81/18* (2013.01); *F25D 31/006* (2013.01)

(58) Field of Classification Search
CPC ........ B65D 45/02; B65D 43/16; B65D 81/18; B65D 45/28; B65D 45/025; F25D 31/006
(Continued)

(56) References Cited

U.S. PATENT DOCUMENTS 1,118,435 A  *  11/1914  Mosler ...................... E05G 1/00
                                                                       220/248
1,709,520 A  *   4/1929  Chandler ............... B65D 45/28
                                                                       292/259 R
(Continued)

FOREIGN PATENT DOCUMENTS

CN        107269173 A       10/2017
CN        108426401 A        8/2018
(Continued)

OTHER PUBLICATIONS

The pertinent parts of CN108426401A.
The pertinent parts of CN107269173A.

*Primary Examiner* — J. Gregory Pickett
*Assistant Examiner* — Niki M Eloshway
(74) *Attorney, Agent, or Firm* — CKC & Partners Co., LLC

(57) ABSTRACT

An airtight device includes a container and an airtight cover on the container, and the airtight cover includes a fixing bracket, a door, and a pressuring handle. The fixing bracket has a through hole and a guiding slot, and the through hole communicates with internal space of the container. The guiding slot has adjacent first and second top surfaces, and the second top surface is higher than the first top surface. The door selectively covers the through hole. The pressuring handle pivoted on the door has a first section, a second
(Continued)

section, and a rotating axis between the first and second sections, and the first section rotates relative to the second section. The second section receives a force to drive the first section to move from below the second top surface to below the first top surface such that the rotating axis pressures the door.

22 Claims, 10 Drawing Sheets

(51) Int. Cl.
*F25D 31/00* (2006.01)
*B65D 81/18* (2006.01)

(58) Field of Classification Search
USPC .................... 220/243, 244, 245, 248, 592.02
See application file for complete search history.

(56) References Cited

U.S. PATENT DOCUMENTS

| | | | | |
|---|---|---|---|---|
| 1,808,403 | A * | 6/1931 | Eklund | F16J 13/08 |
| | | | | 292/48 |
| 4,547,006 | A * | 10/1985 | Castanier | E05B 65/5238 |
| | | | | 292/159 |
| 5,601,206 | A * | 2/1997 | Haas | B60R 9/00 |
| | | | | 220/264 |
| 6,334,560 | B1 * | 1/2002 | Lentini | B60R 9/00 |
| | | | | 220/244 |
| 6,502,868 | B1 * | 1/2003 | Laspa | B25H 3/02 |
| | | | | 292/26 |
| 6,540,268 | B2 * | 4/2003 | Pauser | E05B 65/5261 |
| | | | | 220/780 |
| 10,173,856 | B2 * | 1/2019 | Matsumoto | B65H 3/446 |
| 2018/0031308 | A1 | 2/2018 | Yang et al. | |
| 2018/0038631 | A1 | 2/2018 | Yang et al. | |
| 2019/0242641 | A1 | 8/2019 | Yang et al. | |
| 2020/0200469 | A1 | 6/2020 | Yang et al. | |

FOREIGN PATENT DOCUMENTS

| | | |
|---|---|---|
| CN | 212428465 U | 1/2021 |
| CN | 213573695 U | 6/2021 |
| JP | 2018-505379 A | 2/2018 |
| JP | 2021-42564 A | 3/2021 |
| KR | 20090058979 A | 6/2009 |
| KR | 20150009689 A | 1/2015 |
| TW | 1731778 B * | 6/2021 |

* cited by examiner

AIRTIGHT DEVICE

CROSS-REFERENCE TO RELATED APPLICATION

This application claims priority to U.S. Provisional Application Ser. No. 63/203,870, filed on Aug. 3, 2021 and China Application Serial Number 202111567734.4, filed on Dec. 21, 2021, which are herein incorporated by reference in its entirety.

BACKGROUND

Field of Invention

The present disclosure relates to an airtight device. More particularly, the present disclosure relates to an airtight device which can preserve objects.

Description of Related Art

As technology progressing and spreading, storage devices, such as freezers, reefer containers, and refrigerators, are widely used to store food and medicine.

In the process to store food and medicine, if the doors of the storage devices does not tightly close and generate a gap, the preservation ability will be negatively affected, so as to affect the expiration period of the food or the medicine. Therefore, the food or the medicine would decay or expire to be uneatable or unable to be taken, and this problem would lead to severe waste.

It has become a critical issue about how to provide an airtight device which has tightly closed doors, so as to prevent air leaking and improve the preservation ability.

SUMMARY

In some embodiments of the present disclosure, an airtight device includes a container and an airtight cover disposed on the container, in which the airtight cover includes a fixing bracket, at least one door, and at least one pressuring handle. The fixing bracket has at least one through hole and at least one guiding slot, and the through hole communicates with an interior space of the container, the guiding slot includes a first top surface and a second top surface higher than the first top surface. The at least one door is configured to cover the through hole. The at least one pressuring handle which is pivoted to the door has a first section, a second section, and a rotation pivot between the first and second sections, in which the first section and the second section are configured to rotate relative to each other. The second section is configured to receive a force for driving the first section to move from below the second top surface to below the first top surface such that the rotation pivot pressures the door.

In some embodiments of the present disclosure, the fixing bracket includes a guiding rail, and the door has a protruding portion inserted into the guiding rail. The guiding rail is above the through hole and has a first portion which has a height gradually increasing relative to the through hole, and the door is configured to move toward a lowest end of the first portion to be located at a closed height, and the door is also configured to move away from the lowest end of the first portion to be located at an open height.

In some embodiments of the present disclosure, the guiding rail has a second portion which has a consistent height relative to the through hole and communicates with a higher end of the first portion.

In some embodiments of the present disclosure, the door has a bearing which is disposed at the protruding portion.

In some embodiments of the present disclosure, the airtight cover has a connection rod, and the at least one pressuring handle includes a plurality of the pressuring handles, the second sections of the pressuring handles are rotatably connected to the connection rod.

In some embodiments of the present disclosure, the airtight cover has a fixing lock, and at least a portion of the fixing lock is disposed at a lateral side of the door, in which the fixing lock is configured to vertically move for locking the door on the fixing bracket.

In some embodiments of the present disclosure, the at least one door includes two doors, and each of the two doors includes a sliding rail and a sliding block. One of the two doors is configured to move above another one of the two doors, and the sliding block of the one of the two doors is slidably connected to the sliding rail of the another one of the two doors.

Another aspect of the present disclosure relates to an airtight device including a container, an airtight cover, and a fixing bracket. The airtight cover is disposed on the container, and the airtight cover includes a fixing bracket, two doors, and a plurality of pressuring handles. The fixing bracket has two through holes and a plurality of guiding slots, in which the two through holes communicate with an interior space of the container, and each of the guiding slots includes a first top surface and a second top surface higher than the first top surface. The two doors configured to cover the two through holes respectively. The plurality of pressuring handles are pivoted to the two door respectively, each of the pressuring handles having a first section, a second section, and a rotation pivot disposed between the first and second sections, in which the first section and the second section are configured to rotate relative to each other, and the second section is configured to receive a force for driving the first section to move from below the second top surface to below the first top surface such that the rotation pivot pressures a corresponding one of the two doors.

In some embodiments of the present disclosure, the fixing bracket has a guiding rail, and each of the two doors has a protruding portion inserted into the siding rail. The guiding rail is above the two through holes and has two first portions, and each of the two first portions has a height gradually increasing relative to the two through holes. The two doors are configured to respectively move toward to be in a closed state, and the two doors are also configured to respectively move away from lowest ends of the two first portions to be in an open state.

In some embodiments of the present disclosure, a second portion of the guiding rail has a consistent height relative to the two through holes, and the second portion which communicates with higher ends of the two first portions is located between the two first portions.

In some embodiments of the present disclosure, each of the two doors has a bearing which is disposed at the protruding portion.

In some embodiments of the present disclosure, the airtight cover includes a connection rod connected to the fixing bracket and disposed between the two through holes, and the connection rod has a T-shaped section which fixes the two doors from above and lateral.

In some embodiments of the present disclosure, the airtight cover includes a fixing lock which has at least a portion disposed at a lateral side of the one of the two doors, and the fixing lock is configured to vertically move to fix the one of the two doors to the fixing bracket.

In some embodiments of the present disclosure, each of the two doors includes a sliding rail and a sliding block, and one of the two doors is configured to move above another one of the two doors, the sliding block of the one of the two doors is slidably connected to the sliding rail of the another one of the two doors.

In embodiment of the present disclosure, an airtight device which has a container and an airtight cover is provided, and the airtight cover covers the container and prevents air or liquid from moving in or moving out of the container. Therefore, an object such as food and medicine stored in the container can be isolated from outside space, so as to prevent the air from leaking and prevent the food from decaying and being uneatable. Moreover, the pressuring handles are located on the airtight cover, and the users can easily rotate the pressuring handles to make the airtight cover in the airtight state or release the airtight state.

In embodiment of the present disclosure, an airtight device which has a container and an airtight cover is provided, and the airtight cover covers the container and prevents air or liquid from moving in or moving out of the container. Therefore, an object such as food and medicine stored in the container can be isolated from outside space, so as to prevent the air from leaking and prevent the food from decaying and being uneatable. Moreover, the pressuring handles are located on the airtight cover, and the users can easily rotate the pressuring handles to make the airtight cover in the airtight state or release the airtight state.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
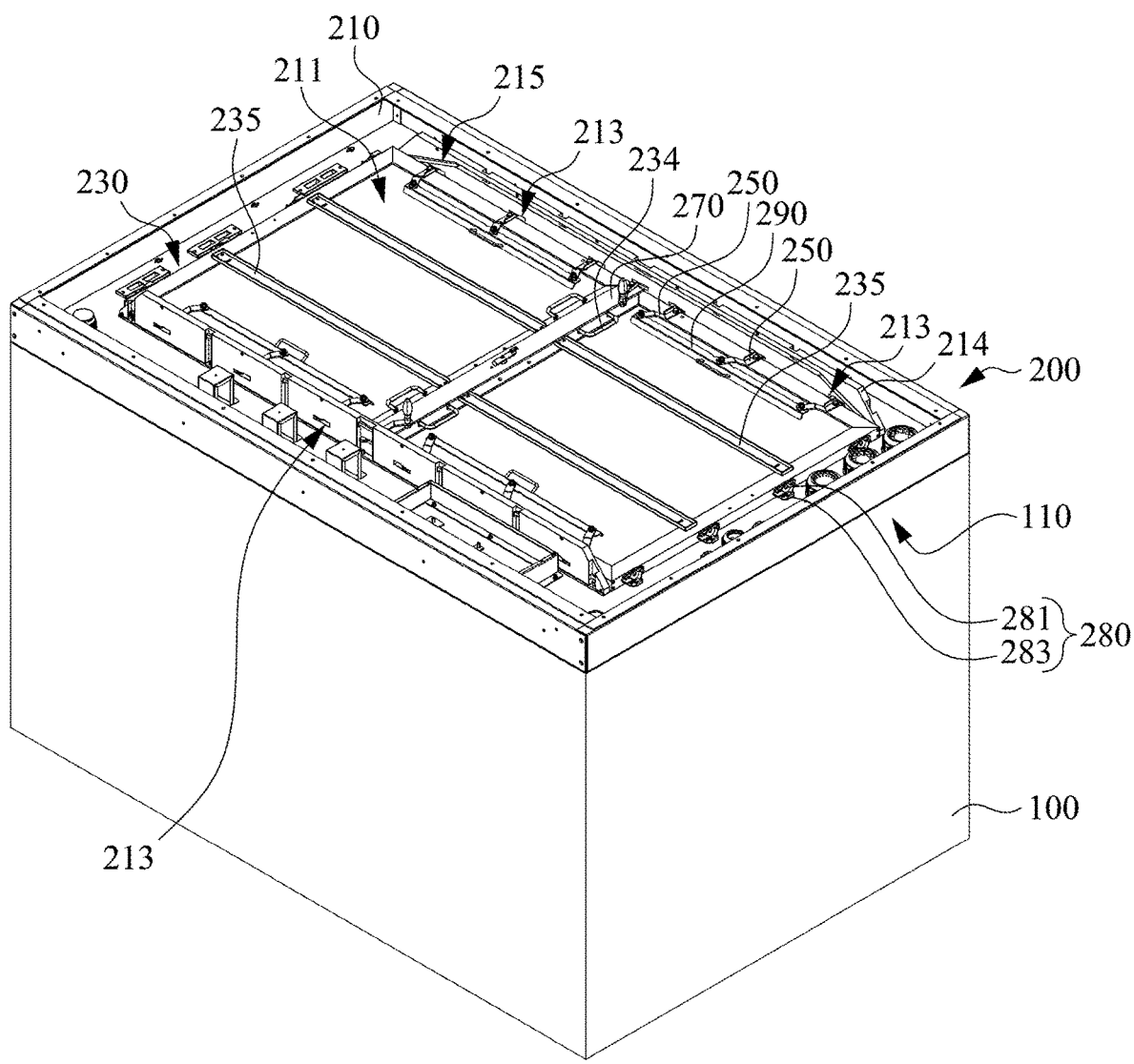
FIG. 1 illustrates a schematic view of an airtight device in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which illustrates a schematic view of an airtight device 10. In some embodiments of the present disclosure, the airtight device 10 can include a freezer, a reefer container, or a refrigerator, in which the airtight device 10 includes a container 100 and an airtight cover 200. The airtight cover 200 which is tightly disposed at an opening 110 of the container 100 can entirely cover the opening 110 and seal the container 100, so as to prevent air and liquid from moving in or out from the container 100. Specifically, the container 100 is a rectangular cabinet or a square cabinet, and the container 100 can accommodate many types of objects, such as food and medicine. In addition, the airtight cover 200 can include a fixing bracket 210, two doors 230, and a plurality of pressuring handles 250, in which users can rotate the pressuring handles 250 to apply pressures to the doors 230 such that the airtight cover 200 is in an airtight condition. Next, the users can reversely rotate the pressuring handles 250 to release the pressures applied to the doors 230 and release the airtight condition of the airtight cover 200. The related information and detail structure about the airtight cover 200 are introduced in the following paragraphs. In some embodiments of the present disclosure, the airtight cover 200 includes one single door 230, and the users can place the single door 230 against the fixing bracket 210 and use the pressuring handles 250 to apply pressures to the single door 230 such that the airtight cover 200 is in the airtight condition.

Figure 2:
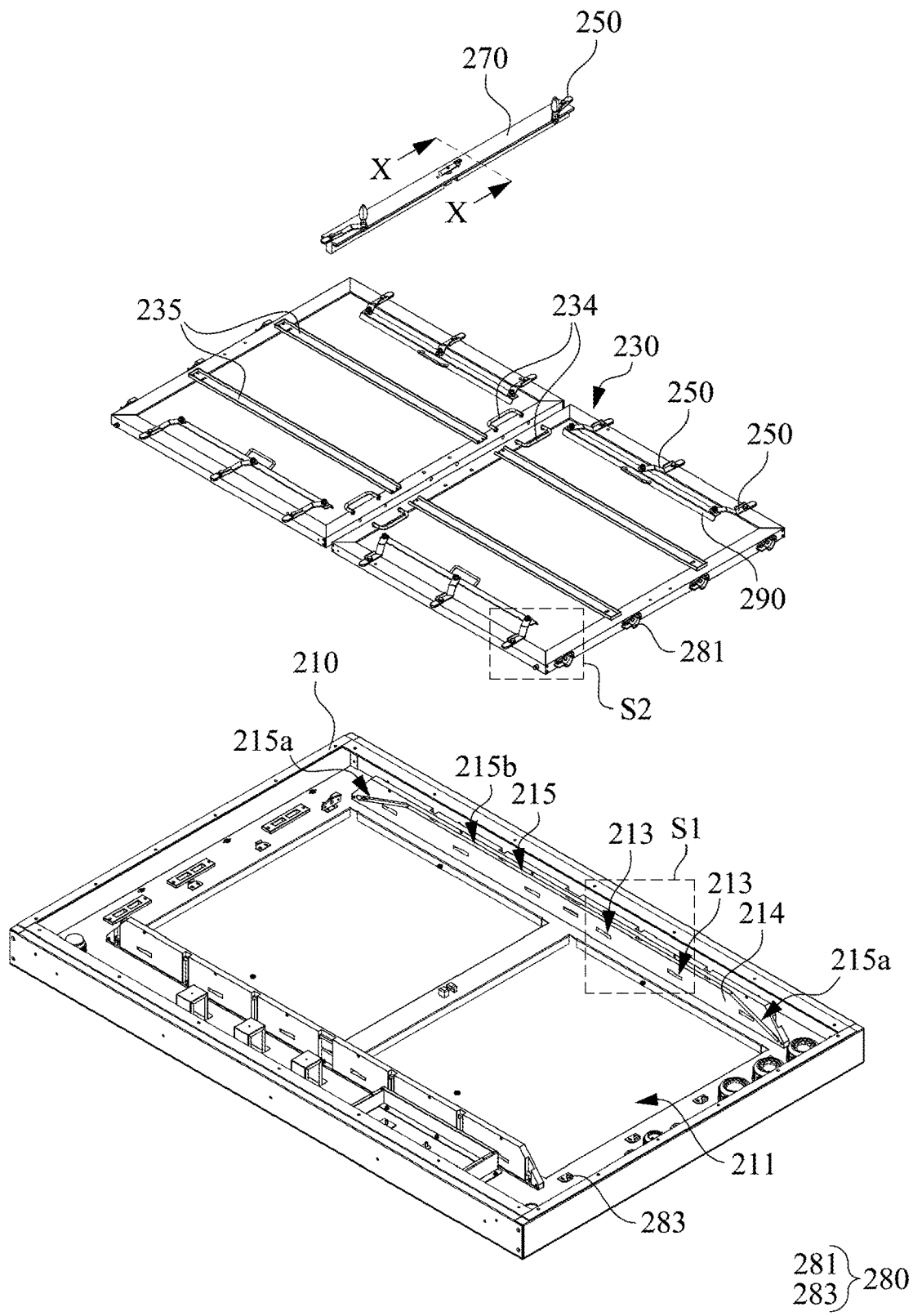
FIG. 2 illustrates an exploded view of an airtight device in accordance with some embodiments of the present disclosure.
Figure 3:
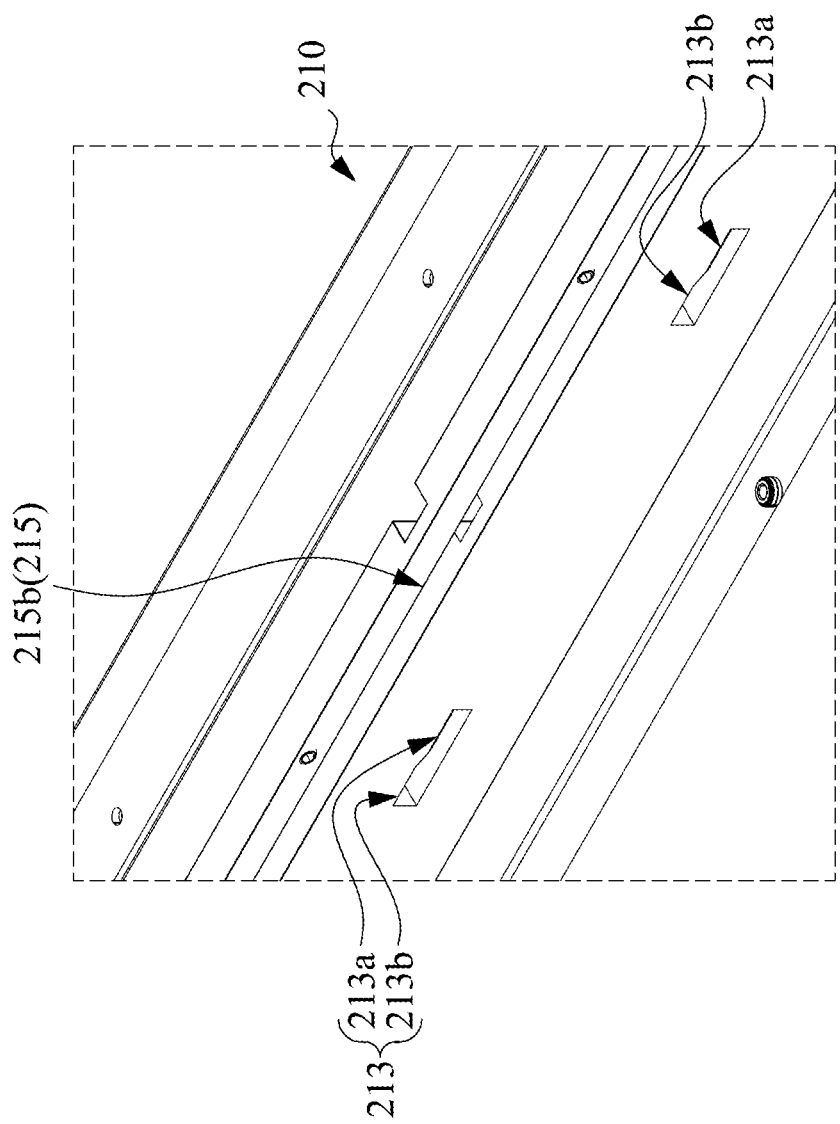
FIG. 3 illustrates a partial enlarged view of a fixing bracket of an airtight cover according to the dotted square S1 in the FIG. 2.
Figure 5:
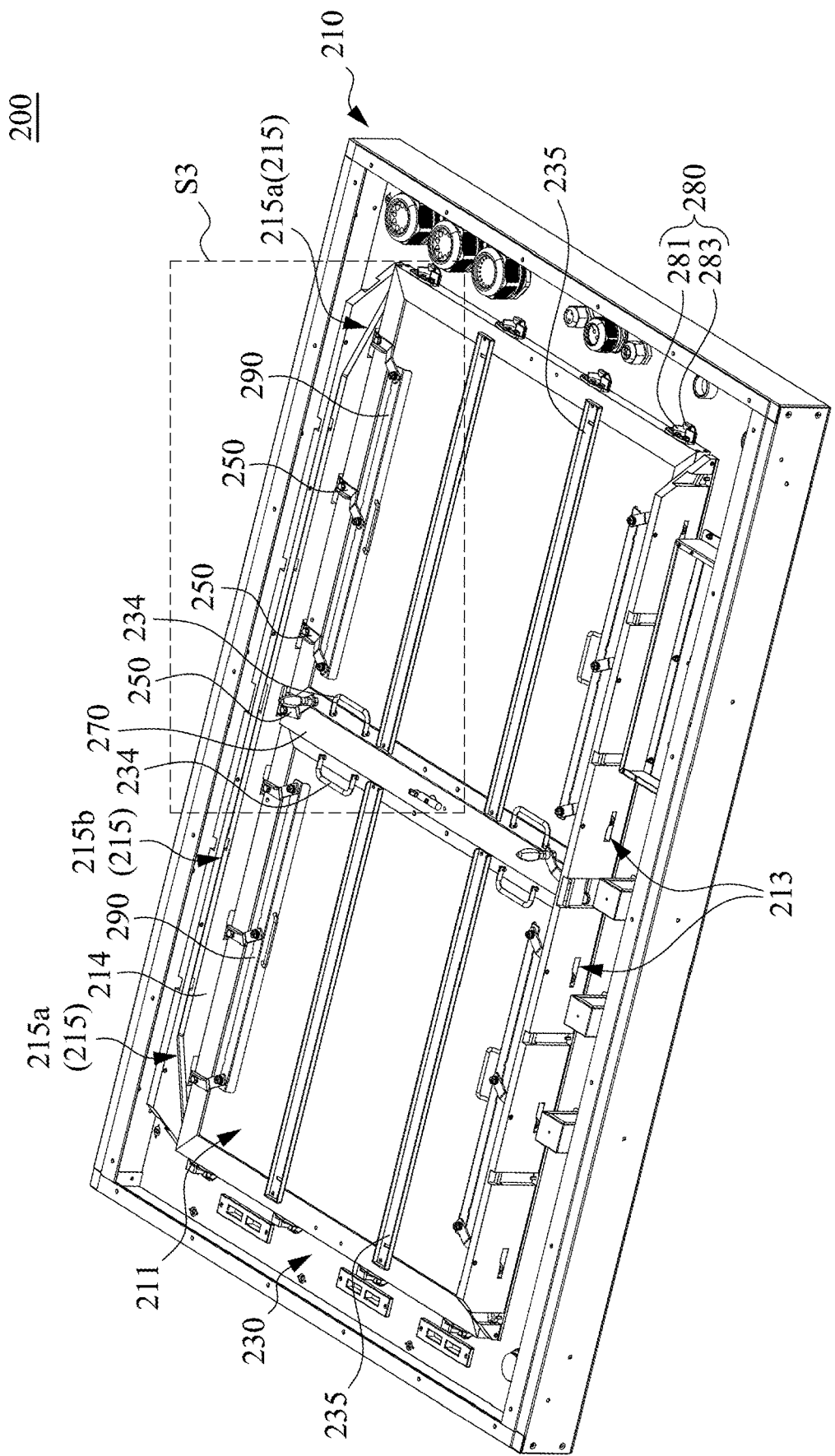
FIG. 5 illustrates a schematic view of an airtight cover which is in a pressurized state in accordance with some embodiments of the present disclosure.
Figure 7:
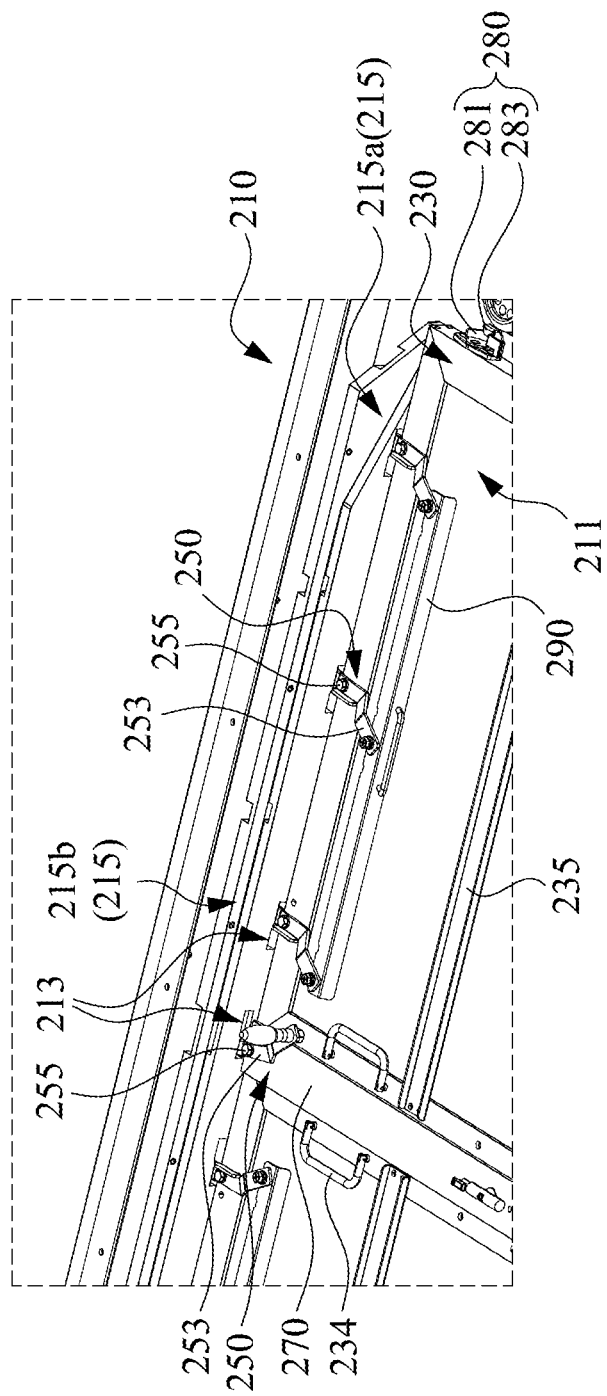
FIG. 7 illustrates an enlarged view according to the dotted square S3 in the FIG. 5.

Please refer to FIGS. 1-3. FIG. 2 illustrates an exploded view of the airtight cover 200. FIG. 3 illustrates an enlarged view of the fixing bracket 210 according to the dotted square S1 in the FIG. 2. In some embodiments of the present disclosure, the fixing bracket 210 has two through holes 211 and a plurality of guiding slots 213, and the through holes 211 communicates with an interior space of the container 100. Therefore, the users can take an object from the container 100 and put an object in the container 100 via the through holes 211 of the airtight cover 200. In addition, the users can move the doors 230 to cover the through holes 211 or leave the through holes 211. The pressuring handles 250 are pivoted to periphery frames the doors 230, and each of the pressuring handles 250 includes a first section 251, a second section 253, and a rotation pivot 255 which is between the first section 251 and the second section 253, in which the first section 251 and the second section 253 are configured to rotate relative to each other. Moreover, each of the guiding slots 213 includes a first top surface 213a and a second top surface 213b adjacent to the first top surface 213a, and the second top surface 213b which is an interior top surface higher than the first top surface 213a which is another interior top surface. The first top surface 213a and the second top surface 213b can form a continuous surface which is a flat surface, an inclined surface, or a curved surface, and the first top surface 213a and the second top surface 213b can form an angle smaller than 90 degrees. In practical application, the first section 251 of each pressuring handle 250 can be pushed and inserted into the corresponding guiding slots 213. Refer to FIGS. 5 and 7, and FIG. 7 illustrates an enlarged view according to the dotted square S3 in the FIG. 5. When the first section 251 moves from below the second top surface 213b to below the first top surface 213a, the first section 251 is against the first top surface 213a to generate a reaction force for driving the rotation pivot 255 and pressuring the doors 230 such that the airtight cover 200 is in the airtight condition. Refer to FIGS.

Figure 6:
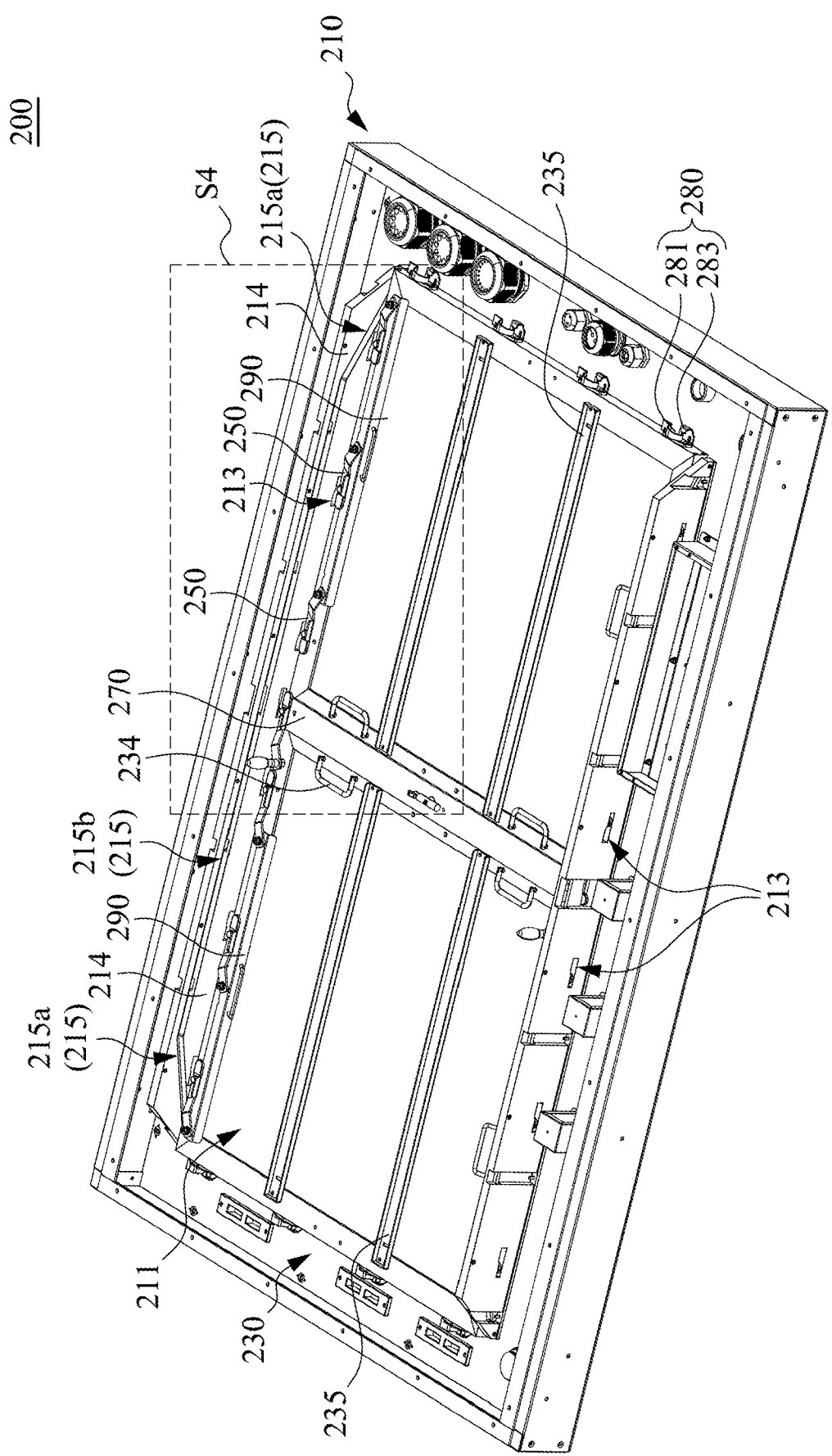
FIG. 6 illustrates a schematic view of an airtight cover which is in a depressurized state in accordance with some embodiments of the present disclosure.
Figure 8:
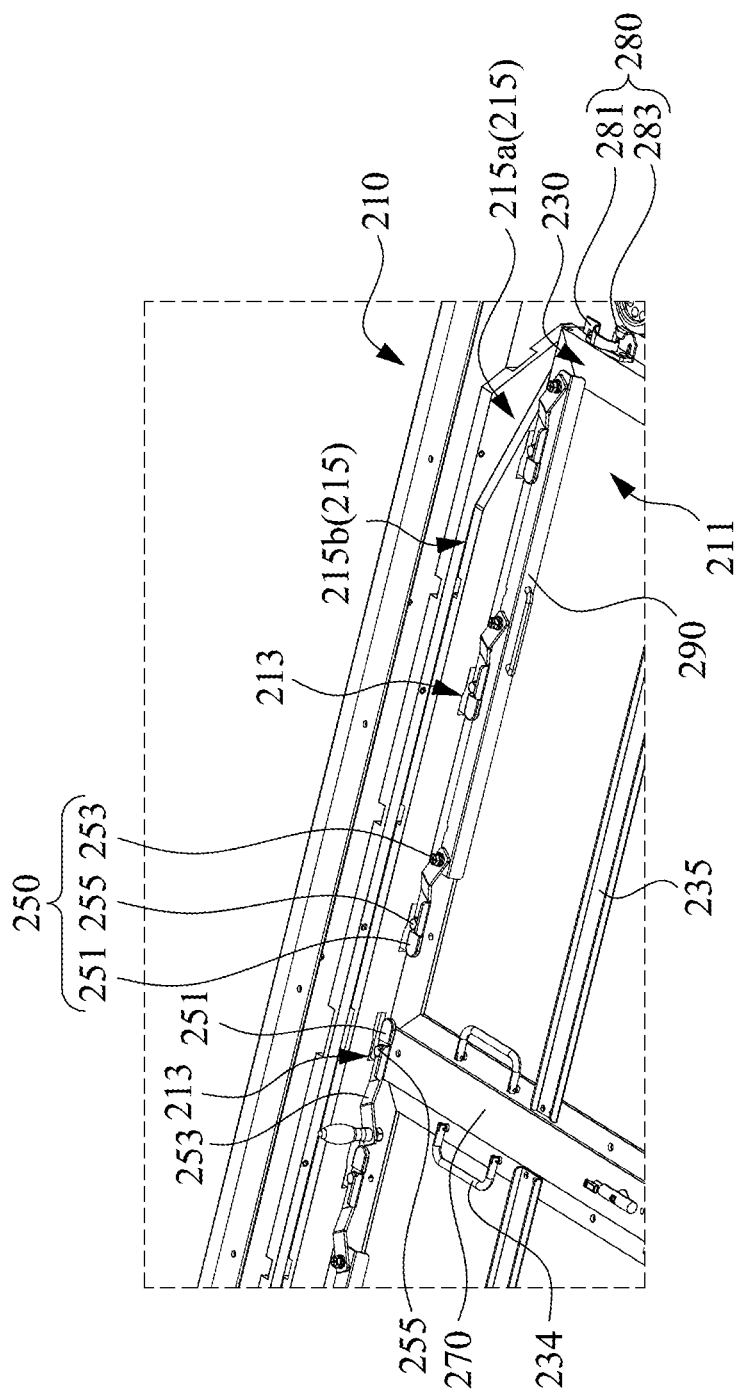
FIG. 8 illustrates an enlarged view according to the dotted square S4 in the FIG. 6.

6 and 8, and FIG. 8 illustrates an enlarged view according to the dotted square S4 in FIG. 6. When the first section 251 moves away from the first top surface 213a, the aforementioned reaction force which is generated by the first top surface 213a and applied to the first section 251 vanishes such that the rotation pivot 255 releases the pressure applied to the corresponding door 230 for leading the airtight cover 200 to release the airtight condition. For instance, when each pressuring handle 250 is pushed to drive the first section 251 to move from below the first top surface 213a to below the second top surface 213b, the aforementioned reaction force which is generated by the first top surface 213a and is applied to the first section 251 vanishes.

Specifically, the fixing bracket 210 can be made of metal, alloy, or polymer which has higher rigidity. For instance, the fixing bracket 210 is made of steel, aluminum metal, aluminum alloy, or plastic. In addition, the guiding slots 213 of the fixing bracket 210 can be manufactured by a machining process or a laser cutting process, but the present disclosure is not limited in this respect. The doors 230 are in shapes corresponding to shapes of the through holes 211 of the fixing bracket 210, and the doors 230 can be rectangular or square. The through holes 211 can also be rectangular or square, and the doors 230 are slightly greater than the through holes 211. Therefore, when the doors 230 respectively cover the through holes 211, the doors 230 can respectively entirely block the through holes 211 from a top view. In addition, each of the doors 230 includes the periphery frame and a transparent sheet surrounded by the periphery frame such that the users can see the interior space of the container 100 through the doors 230. The periphery frame can include metal, alloy, or polymer, such as steel, aluminum metal, aluminum alloy, and plastic which has higher rigidity. The transparent sheet can include transparent glass or transparent polymer, but the present disclosure is not limited in this respect.

In some embodiments of the present disclosure, the fixing bracket 210 further includes two sidewalls 214 and two guiding rails 215, and the two sidewalls 214 which are respectively located at two corresponding sides of the through holes 211 extend on a top surface of the fixing bracket 210. The guiding slots 213 and the two guiding rails 215 are at least located at a side where the two sidewalls 214 face the through holes 211, and the doors 230 are located between the two sidewalls 214 and slidably connected between the two guiding rails 215. In some other embodiments of the present disclosure, each of the guiding slots 213 and the two guiding rails 215 extends from a front surfaces of the corresponding sidewall 214 which faces the through holes 211 to a rear surfaces of the corresponding sidewall 214 such that each of the pressuring handles 250 can smoothly rotate by receiving a force after the first section 251 is inserted into the corresponding guiding slot 213. The present disclosure is not limited in this respect.

Figure 4:
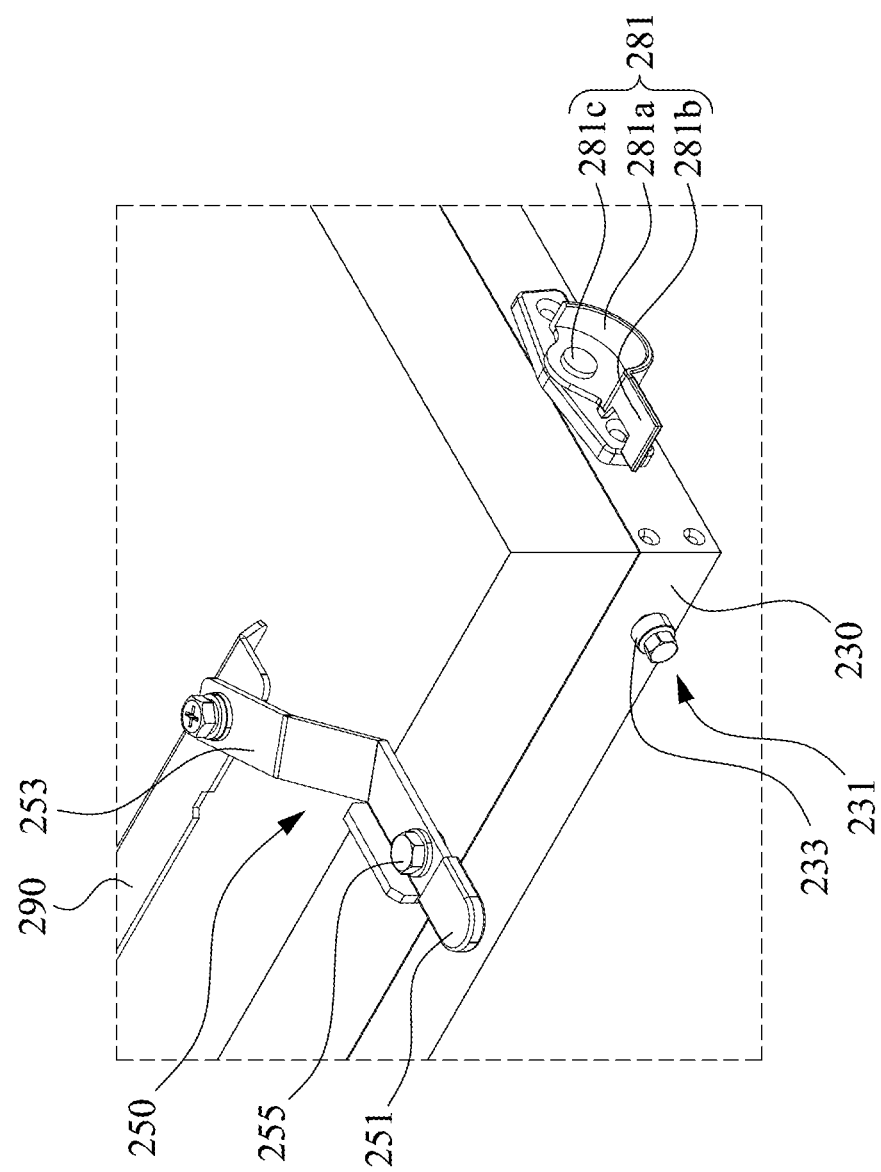
FIG. 4 illustrates a partial enlarged view of a door of an airtight cover according to the dotted square S2 in the FIG. 2.

Please refer to FIGS. 1-4. FIG. 4 illustrates an enlarged view of the doors 230 according to the dotted square S2 in FIG. 2. In some embodiments of the present disclosure, each of the doors 230 has protruding portions 231 which are respectively inserted into the two guiding rails 215 such that the doors 230 can move relative to the two guiding rails 215. In addition, the doors 230 further include bearings 233, the bearings 233 are respectively located at the protruding portions 231 and configured to respectively rotate in the two guiding rails 215. In practical application, the protruding portions 231 and the bearings 233 are benefit for the doors 230 to move against the fixing bracket 210.

In some embodiments of the present disclosure, each of doors 230 includes handles 234, and the handles 234 and the protruding portions 231 are respectively located at two corresponding sides of each door 230, the user can lift and move the doors 230 by the handles 234. When the users move the doors 230 or rotate the doors 230 relative to the protruding portions 231, the guiding rails 215 respectively support the protruding portions 231. Therefore, the protruding portions 231 are pivot points of the doors 230 as moving or rotating the doors 230, so as to save the users' strength.

Specifically, the guiding rails 215 are inverted U-shaped, and the guiding rails 215 are higher than and entirely above the top surface of the fixing bracket 210 and the through holes 211. Each of guiding rails 215 has two first portions 215a, and each of the two first portions 215a has a height which is relative to the top surface of the fixing bracket 210 or the through holes 211 gradually increasing toward a center of each guiding rail 215. Therefore, the first portions 215a are higher than the fixing bracket 210 and inclined relative to the top surface the fixing bracket 210. In addition, each guiding rail 215 has a second portion 215b, and the second portion 215b has a consistent height relative to the through holes 211 or the top surface of the fixing bracket 210, in which the second portion 215b which communicates with higher ends of the two first portions 215a is located between the two first portions 215a. Therefore, each of first portions 215a has the height relative to the top surface of the fixing bracket 210 gradually increasing toward the second portion 215b. In addition, each door 230 can move inclinedly along the corresponding first portion 215a, in which each door 230 can move vertically and horizontally along the corresponding first portion 215a. Each door 230 can also horizontally move along the second portion 215b of the corresponding guiding rail 215, and each door 230 can be pushed to move between the first portions 215a and the second portion 215b.

Figure 9:
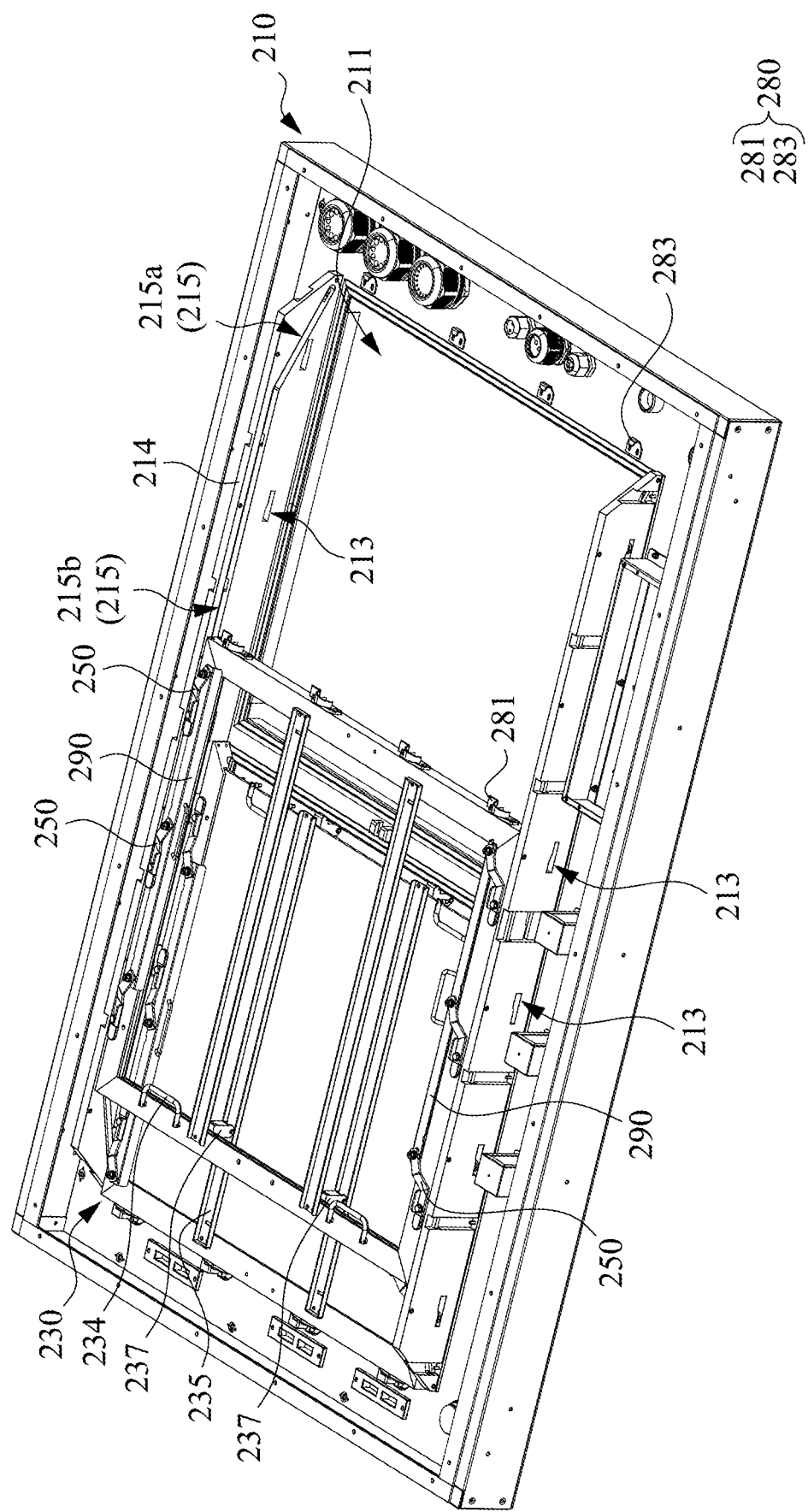
FIG. 9 illustrates a schematic view of the airtight cover which is in an airtight state.

In practical application, the two doors 230 can move toward lowest end of the corresponding first portions 215a such that the airtight cover 200 is in a closed state. One of the two doors 230 can move away from a lowest end of the corresponding first portions 215a such that the airtight cover 200 is in an open state. Each door 230 can move toward the corresponding through hole 211 to cover the corresponding through hole 211. Each door 230 can move away from the corresponding through holes 211 along the corresponding first portions 215a to leave the corresponding through hole 211. Referring to FIGS. 5 and 6, the two doors 230 are located at the lowest ends of the corresponding first portions 215a, and each door 230 is at a closed height such that the airtight cover 200 is in the closed state. Referring to FIG. 9, one of the two doors 230 moves away from the corresponding through hole 211 along the first portion 215a to expose the corresponding through hole 211, and the one of the two doors 230 is located at the highest end of the corresponding first portion 215a or locate at the corresponding second portion 215b. In addition, one of the two doors 230 is at an open height which is relative to the top surface of the fixing bracket 210 and is greater than a thickness of another one of the two doors 230, and the airtight cover 200 is in the open state. Therefore, one of the two doors 230 can move at the open height along the guiding rails 215 to be directly above another one of the doors 230 such that the two doors 230 are at least partially overlapped seeing from above. When the two doors 230 are respectively at the open height and the closed height, the two doors 230 are substantially parallel to each other, and thus the necessary space for opening at least one of the two doors 230 or closing the two doors is small.

In some embodiments of the present disclosure, the guiding slots 213 are lower than the second portions 215b of the guiding rails 215, and the guiding slots 213 are between the two first portions 215a. Therefore, when the doors 230 are located at the first portions 215a and at the closed height to cover the through holes 211, the pressuring handles 250 push against the guiding slots 213 to pressure the doors 230, so as to prevent the pressuring handles 250 from affecting the doors 230 as rotating. The present disclosure is not limited in this respect.

In some embodiments of the present disclosure, each door 230 includes two sliding rails 235 which extend parallel to each other and two sliding blocks 237, and the two sliding rails 235 are located on a top surface of the corresponding door 230, the sliding blocks 237 are located at a bottom surface of the corresponding door 230. Moreover, the two sliding rails 235 extend from an edge of the corresponding door 230 to another edge of the corresponding door 230, and thus the two sliding rails 235 can fix the door 230 and increase the mechanical strength of the door 230. For instance, the two sliding rails 235 extend across two opposite sides of the corresponding door 230. Referring to FIGS. 6 and 9, one of the two doors 230 is moved to be above another one of the two doors 230 along the guiding rails 215, and the sliding blocks 237 of the one of the two doors 230 are respectively slidably connected to the two sliding rails 235 of the another one of the two doors 230 such that the two doors 230 can stack together and support mutually for moving horizontally relative to each other. Specifically, wheels are respectively disposed at the sliding blocks 237 such that the two sliding blocks 237 can move on the two sliding rails 235 via the wheels.

Figure 10:
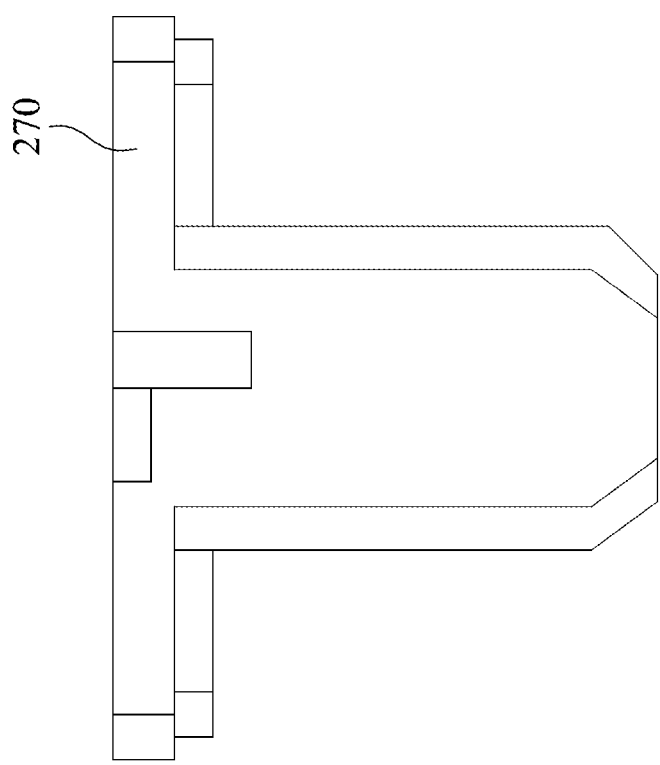
FIG. 10 illustrates a cross section view of a fixing rod drawn from a cross section line X in FIG. 2.

Please refer to FIG. 10 which illustrates a cross section view of a fixing rod 270 taken from a cross section line X in FIG. 2. In some embodiments of the present disclosure, the airtight cover 200 includes the fixing rod 270 which is detachably connected to the fixing bracket 210, and the fixing rod 270 is disposed between the two through holes 211 and crosses two opposite side of the through holes 211. The fixing rod 270 has a T-shaped cross section for fixing the two doors 230 to the fixing bracket 210 from above and lateral. In addition, the pressuring handles 250 are disposed on the fixing rod 270 to pressure the fixing rod 270, and the pressuring handles 250 can pressure the doors 230 through the fixing rod 270. Therefore, the airtight cover 200 can further provide outstanding airtight function, and the mechanical strength of the airtight cover 200 can be increased by using the combination of the pressuring handles 250 and the fixing rod 270.

Please refer to FIGS. 2-3. In some embodiments of the present disclosure, the airtight cover 200 includes a fixing lock 280 which has at least a portion disposed at a lateral side of the corresponding door 230 and configured to vertically move for fixing the corresponding door 230 to the fixing bracket 210. In addition, the fixing lock 280 includes a rotary hook 281 and a fixing hook 283, and the rotary hook 281 is configured to selectively fix the fixing hook 283 and is located at a lateral side the corresponding door 230. In addition, the fixing hook 283 is located on the fixing bracket 210 and is adjacent to an edge of the corresponding through hole 211. Specifically, the rotary hook 281 includes a C-shaped portion 281a, an arm 281b, and a rotation pivot 281c, in which the C-shaped portion 281a is rotatably connected to the rotation pivot 281c, and the arm 281b is located at an end of the C-shaped portion 281a. The arm 281b is configured to be pushed to drive the C-shaped portion 281a to rotate relative to the rotation pivot 281c, and thus the C-shaped portion 281a can further be fixed to or be separated from the fixing hook 283 such that the two doors 230 can be fixed to or be detachable from the fixing bracket 210. Therefore, the users can easily rotate the fixing lock 280 along a vertical plane to lock the corresponding door 230 and fix the corresponding door 230 to the fixing bracket 210. In comparison with normal fixing structures, the rotary hook 281 of the fixing lock 280 merely rotates along the vertical plane for fixing the fixing hook 283 such that the fixing lock 280 can save the necessary space to lock and fix the corresponding door 230.

In other embodiments of the present disclosure, the airtight cover 200 does not include the sidewalls 214 and the guiding rails 215, and the doors 230 are detachably fixed to the fixing bracket 210. Therefore, the users can put the doors 230 which are separated from the fixing bracket 210 on the fixing bracket 210, and then the users can fix the doors 230 to the fixing bracket 210 via the fixing lock 280. The users can use the pressuring handles 250 to pressure the doors 230 such that the airtight cover 200 is in the airtight state. Moreover, after the users release the airtight state of the airtight cover 200 by using pressuring handles 250, the users can further unlock the fixing lock 280, and the doors 230 are in a detachable state relative to the fixing bracket 210 such that the users can easily move the doors 230 away from the fixing bracket 210.

Please refer to FIGS. 5-8. In some embodiments of the present disclosure, the airtight cover 200 includes a connection rod 290, and the second sections 253 of the pressuring handles 250 are rotatably connected to the connection rod 290. Therefore, the users can push the connection rod 290 to simultaneously move the pressuring handles 250 for pressuring the doors 230 or releasing the pressures applied to the doors 230 such that the airtight cover 200 can efficiently switches to the airtight condition and prevent the air in the container 100 from leaking.

In embodiment of the present disclosure, an airtight device which has a container and an airtight cover is provided, and the airtight cover covers the container and prevents air or liquid from moving in or moving out of the container. Therefore, an object such as food and medicine stored in the container can be isolated from outside space, so as to prevent the air from leaking and prevent the food from decaying and being uneatable. Moreover, the pressuring handles are located on the airtight cover, and the users can easily rotate the pressuring handles to make the airtight cover in the airtight state or release the airtight state.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:
1. An airtight device, comprising:
a container; and
an airtight cover disposed on the container, wherein the airtight cover comprises:
a fixing bracket having at least one through hole and at least one guiding slot, wherein the through hole communicates with an interior space of the container, the guiding slot comprises a relatively wide opening and a relatively narrow opening, the relatively narrow opening has a first top surface and the relatively wide opening has a second top surface higher than the first top surface;

at least one door configured to cover the through hole; and at least one pressuring handle pivoted to the door, the pressuring handle having a first section, a second section, and a rotation pivot disposed between the first and second sections, wherein the first section and the second section are configured to rotate relative to each other, and wherein the second section is configured to receive a force for driving the first section to move from below the second top surface to below the first top surface such that the rotation pivot pressures the door.

2. The airtight device of claim 1, wherein the fixing bracket comprises a guiding rail, the guiding slot and the guiding rail are separate and different concave structures on a sidewall of the fixing bracket, the door has a protruding portion inserted into the guiding rail, and the guiding rail is above the through hole and has a first portion which has a height gradually increasing relative to the through hole, and wherein the door is configured to move toward a lowest end of the first portion to be located at a closed height, and the door is also configured to move away from the lowest end of the first portion to be located at an open height.

3. The airtight device of claim 2, wherein the guiding rail has a second portion which has a consistent height relative to the through hole and communicates with a higher end of the first portion.

4. The airtight device of claim 2, wherein the door has a bearing which is disposed at the protruding portion.

5. The airtight device of claim 1, wherein the airtight cover has a connection rod, and the at least one pressuring handle includes a plurality of the pressuring handles, the second sections of the pressuring handles are rotatably connected to the connection rod.

6. The airtight device of claim 1, wherein the airtight cover has a fixing lock, at least a portion of the fixing lock is disposed at a lateral side of the door, and wherein the fixing lock is configured to vertically move for locking the door on the fixing bracket.

7. The airtight device of claim 1, wherein the relatively wide opening and the relatively narrow opening share a continuous straight edge.

8. An airtight device, comprising:

a container; and an airtight cover disposed on the container, wherein the airtight cover comprises:

a fixing bracket having two through holes and a plurality of guiding slots, wherein the two through holes communicate with an interior space of the container, each of the guiding slots comprises a relatively wide opening and a relatively narrow opening, the relatively narrow opening has a first top surface and the relatively wide opening has a second top surface higher than the first top surface;

two doors configured to cover the two through holes respectively; and a plurality of pressuring handles pivoted to the two doors respectively, each of the pressuring handles having a first section, a second section, and a rotation pivot disposed between the first and second sections, wherein the first section and the second section are configured to rotate relative to each other, and wherein the second section is configured to receive a force for driving the first section to move from below the second top surface to below the first top surface such that the rotation pivot pressures a corresponding one of the two doors.

9. The airtight device of claim 8, wherein the fixing bracket has a guiding rail, the guiding slots and the guiding rail are separate and different concave structures on a sidewall of the fixing bracket, each of the two doors has a protruding portion inserted into the guiding rail, and the guiding rail is above the two through holes and has two first portions, each of the two first portions has a height gradually increasing relative to the two through holes, and wherein the two doors are configured to respectively move toward lowest ends of the two first portions to be in a closed state, and the two doors are also configured to respectively move away from the lowest ends of the two first portions to be in an open state.

10. The airtight device of claim 9, wherein a second portion of the guiding rail has a consistent height relative to the two through holes, and the second portion which communicates with higher ends of the two first portions is located between the two first portions.

11. The airtight device of claim 9, wherein each of the two doors has a bearing which is disposed at the protruding portion.

12. The airtight device of claim 8, wherein the airtight cover comprises a connection rod connected to the fixing bracket and disposed between the two through holes, and wherein the connection rod has a T-shaped section which fixes the two doors from above and lateral.

13. The airtight device of claim 8, wherein the airtight cover comprises a fixing lock which has at least a portion disposed at a lateral side of the one of the two doors, and the fixing lock is configured to vertically move to fix the one of the two doors to the fixing bracket.

14. The airtight device of claim 8, wherein the relatively wide opening and the relatively narrow opening share a continuous straight edge.

15. An airtight device, comprising:

a container; and an airtight cover disposed on the container, wherein the airtight cover comprises:

a fixing bracket having at least one through hole, at least one guiding slot, and a guiding rail, wherein the through hole communicates with an interior space of the container, the guiding rail is above the through hole and has a first portion which has a height gradually increasing relative to the through hole, and the guiding slot comprises a first top surface and a second top surface higher than the first top surface, the guiding slot and the guiding rail are separate and different concave structures on a sidewall of the fixing bracket;

at least one door configured to cover the through hole, wherein the door has a protruding portion inserted into the guiding rail, and wherein the door is configured to move toward a lowest end of the first portion such that the door is at a closed height; and at least one pressuring handle pivoted to the door, the pressuring handle having a first section, a second section, and a rotation pivot disposed between the first and second sections, wherein the first section and the second section are configured to rotate relative to each other, and wherein the second section is configured to receive a force for driving the first section to move from below the second top surface to below the first top surface such that the rotation pivot pressures the door.

16. The airtight device of claim 15, wherein the guiding rail has a second portion which has a consistent height relative to the through hole communicates with a higher end of the first portion.

17. The airtight device of claim 15, wherein the door has a bearing which is disposed at the protruding portion.

18. The airtight device of claim 15, wherein the airtight cover has a connection rod, and the at least one pressuring handle includes a plurality of the pressuring handles, the second sections of the pressuring handles are rotatably connected to the connection rod.

19. The airtight device of claim 15, wherein the airtight cover has a fixing lock, at least a portion of the fixing lock is disposed at a lateral side of the door, and wherein the fixing lock is configured to vertically move for locking the door on the fixing bracket.

20. The airtight device of claim 15, wherein the guiding slot is disposed between the through hole and the guiding rail, and the guiding rail has a greater length than the guiding slot.

21. The airtight device of claim 15, wherein the guiding slot comprises a relatively wide opening and a relatively narrow opening, the relatively narrow opening has the first top surface and the relatively wide opening has the second top surface higher than the first top surface.

22. The airtight device of claim 21, wherein the relatively wide opening and the relatively narrow opening shares a continuous straight edge.

\* \* \* \* \*